US007135980B2

(12) United States Patent
Moore et al.

(10) Patent No.: US 7,135,980 B2
(45) Date of Patent: Nov. 14, 2006

(54) PHYSIOMAGNETOMETRIC INSPECTION AND SURVEILLANCE SYSTEM AND METHOD

(75) Inventors: Wayne K. Moore, Gaithersburg, MD (US); William F. Frizzell, Washington, WA (US); Neil C. Munro, Lothian, MD (US)

(73) Assignee: Radian, Inc., Alexandria, VA (US)

( * ) Notice: Subject to any disclaimer, the term of this patent is extended or adjusted under 35 U.S.C. 154(b) by 546 days.

(21) Appl. No.: 10/288,379

(22) Filed: Nov. 6, 2002

(65) Prior Publication Data

US 2003/0133597 A1 Jul. 17, 2003

(51) Int. Cl.
*G05B 19/00* (2006.01)
*G08B 13/00* (2006.01)
*G08B 23/00* (2006.01)
*G06K 9/00* (2006.01)

(52) U.S. Cl. .................... 340/573.1; 340/5.2; 340/5.7; 340/5.8; 340/541; 382/115; 382/116; 382/117; 382/118; 382/124

(58) Field of Classification Search ................ 340/541, 340/573.1, 5.2, 5.7, 5.8; 382/118, 124, 116, 382/115, 117; 600/473, 340
See application file for complete search history.

(56) References Cited

U.S. PATENT DOCUMENTS 5,507,291 A 4/1996 Stirbl et al.
5,771,261 A 6/1998 Anbar
5,957,859 A 9/1999 Rosenfeld
6,496,595 B1 * 12/2002 Puchek et al. ............. 382/124
6,600,946 B1 * 7/2003 Rice ........................... 600/473
6,720,874 B1 * 4/2004 Fufido et al. ............... 340/541

OTHER PUBLICATIONS

Mann, Stewart M., System and Method for Robbery Prevention; Feb. 11, 1999; WIPO; WO 99/06974.*

* cited by examiner

*Primary Examiner*—Daniel Wu
*Assistant Examiner*—Lam Pham
(74) *Attorney, Agent, or Firm*—Duane Morris LLP

(57) ABSTRACT

A passive biometric surveillance system capable of controlling access to a secure area or holding area for further interrogation or detainment. The system or apparatus passively measures a subject's various physiological parameters and compares a produced digital figure or facial image to a database. If the image corresponds to a notable individual, the subject is allowed access only to the holding area for further interrogation. If the image does not correspond to a notable individual, the system or apparatus provides an audio and/or video object or stimulus to the subject. The system or apparatus passively measures the subject's post-stimulus physiological parameters and compares these parameters with a predetermined threshold(s). Depending upon the outcome of this comparison, the subject is either allowed to pass into the secure area or is allowed only into the holding area for further interrogation.

24 Claims, 5 Drawing Sheets

| | Wants and Warrants Confirmation | Metal Detector | Infrared Comparison | Coronary Comparison | Respiratory Comparison | Kurlien / Tesla Image Comparison | Load Cell Data | |
|---|---|---|---|---|---|---|---|---|
| Parametric Requirement | | | | | | | | Within |
| | | | | | >2 | | | Outside |
| Passage | | | | | | | | Secure A |
| | 1 | 1 | | | >2 | | | Holding A |

FIGURE 2

PRISS FUNCTIONAL DIAGRAM

PRISS FUNCTIONAL DIAGRAM
(CONT'D)

PHYSIOMAGNETOMETRIC INSPECTION AND SURVEILLANCE SYSTEM AND METHOD

BACKGROUND

The terrorist actions of Sep. 11, 2001, resulted from commercial aircraft hijacking which had a devastating impact upon the economic structure of the United States. The ease of passage and entry of passengers on an aircraft, which is highly desirable for attracting and maintaining customer demand for air transportation, facilitated the groups of individuals who took over the aircraft by overpowering the crews, enabling the rerouting of the aircraft and the crashing into the Pentagon in Arlington, Va. and World Trade Center complex in New York, N.Y. A problem identified during the analysis of the events of Sep. 11, 2001 was that obvious adequate screening did not exist to determine intent of potential hijackers or apply profiles to identify potential hijackers at that time. The number of passengers and the limited tolerance of such passengers to submit to personally invasive searches has resulted in a patchwork of generic scanning and randomly selective physical searches in response to the apparent inadequacy. This patchwork of security measures is an ineffective compromise that has yet to show an effective security coverage and has inconvenienced passengers to such an extent that a significant drop in air service use has resulted.

A more directed approach would be to select those passengers who would most likely prove a threat and subject them to greater scrutiny in more intensive and invasive searches. The challenge is to screen out individuals to determine those having malicious intent similar to those contemplating similar tragic acts while not further restricting or harassing the vast majority of innocuous travelers. While the events of 9/11 have focused concerns of the security of air travel, an effective security screening is desirable in any environment where physical security is a concern.

Passive biometric devices seemed to be the logical direction of interest. Biometric devices have been developed that can transform physiological characteristics into a quantitative parameters. These physiologic parameters may then be used to determine probabilities of potential criminal acts directed towards an airline flight or other activity where human life may be at risk.

Usually, people with criminal or malevolent intent will betray themselves by elevated pulse rates, increased blood pressure, heightened respiration rates, excessive or varying patterns of perspiration, changing weight distribution, color and size variation in irises and pupils, alterations in voice stress, and changes in electromagnetic aura which are generally involuntary and unconscious reactions.

Known lie detectors are one such type of biometric device in which changes in biometric parameters are used to determine the truthfulness or deceptiveness of a subject. However, there are several problems associated with such devices; the subject is aware of the device, the results must be subjectively analyzed and the device requires physical contact with the subject. These problems make the detectors ineffective in screening large volumes of subjects due to both cost and time.

There are several known biometric devices that are effective obtaining physiological parameters in a passive manner without such physical contact and/or subject awareness.

Infrared imaging may be used to capture and quantify the "blush" that often accompanies deception or nervousness. While the characteristics of an infrared image are not always related to unconscious thought and may be subject to environmental conditions, this parameter may be monitored without actually touching the subject.

Coronary and respiratory rate and/or rhythm often exhibit change under stress and while not always related to unconscious thought, and subject to environmental conditions such as temperature and physical exertion of the subject, these parameters may be monitored without actually touching the subject as well.

Electromagnetic imaging can capture the electromagnetic field of a subject in a method similar to infrared imaging. Again, while the electromagnetic image may not always be related to unconscious thought and may be subject to environmental condition, this parameter can be monitored without actually touching the subject.

Load cells can obtain the anxious foot motion and shifting often accompanying a subject under strain. Anxious foot motion, while not always an unconscious act, can be obtained without the knowledge of the subject.

Eye scanning may be accomplished with digital imaging. The color of the iris and size of the pupil can be determined using such a method. Changes in these parameters are often associated with deception or nervousness and while these changes are not always unconscious acts, each may be monitored without the knowledge or physical contact of the subject.

Generally, a monitored physiological parameter is compared with a reference value. Typically, these reference values are derived by prior knowledge of the subject. The prior knowledge often includes age, size, and sex and generic average values associated with these variables. In the prior art, changes during monitoring may also be correlated to a conversation or event subsequent to the monitoring for analysis, such an approach is disclosed in U.S. Pat. No. 5,507,291 to Stirbl et al, the entirety of which is incorporated herein by reference. These correlations are performed subjectively at a time distant from the monitoring. Changes in these physiological parameters may be used at least as indicators or as signals that an emotional state exists or has come into being in the subject that may be malevolent. However, this prior art is not able to perform a real-time analysis of the monitored parameter with the reference value.

Thus, a real time approach that can exist in parallel with current screening processes enabling singular and controlled assessment without reduction of existing throughput speeds would address the security concerns without the detrimental commercial effects of prior art approaches. Such a system would obviously be advantageous for use as described above for the customer base of the commercial airline industry. Additionally, such a system would likewise be advantageous in controlling access to courtrooms, police stations, places of assembly, and similar buildings/areas that require security or could be considered terrorist targets.

In view of the unmet needs and problems with prior art solutions, it is an object of the disclosure to provide a novel system and method by which subjects may be processed quickly and anonymously by automated biometric assessment, allowing personal attention to be afforded those subjects that respond to stimulus in ways associated with ill intention. The disclosure affords a dispassionate analysis and permits high throughput of subjects on acceptable and legal business, while enabling the detention of suspect individuals for further query. The routing of these two separate groups may be accomplished by turnstile segregation of the subject population. Implementation of the disclosure may reduce search and evaluation time by as much as seventy to eighty percent when compared with prior art individual queries.

Where entry security or personnel control is required, the disclosure offers an efficient filter for admittance to airport terminals, banking and insurance offices, courts, stadiums, police stations, conference centers, military bases, sensitive corporate sites, other transportation terminals and penal institutions.

It is therefore an object of the present disclosure to overcome the limitations of the prior art and to provide an inspection station for determining a subject's physiological reaction to a stimulus. The inspection station may comprise of one or more physiological stand-off sensors, an electronic storage device, a stimulation interface capable of exposing the subject to a predetermined stimulus object, a processor, and one or more controllable egress gates.

It is a further object of the present disclosure to provide a method for profiling a subject without physical contact comprising of the steps of acquiring a baseline representation of at least one characteristic of the subject, and prompting the subject with a visual and/or audio object or stimulus. After prompting the subject, the method further includes acquiring a post-prompting representation of at least one characteristic of the subject, determining if a difference in at least one characteristic between the post-prompting representation and the baseline representation exceeds an associated threshold, and profiling the subject based on any exceeded thresholds.

It is another object of the present disclosure to present a passive biometric surveillance station comprising of a resident database, a means for determining if a subject is in the resident database, and a means for stimulating the subject. The passive biometric surveillance station may also comprise a means for determining a physiological reaction to the stimulus and a means for comparing the physiological reaction to a normal physiological reaction.

It is still a further object of the present disclosure to provide a physical portal between a general area and a secure area and a method of granting access to a secure area to include the quantitizing of the physiological responses of the human subjects to a stimulus and the granting of access based upon said quantitizing.

It is another object of the present disclosure to provide a method of screening subjects for access to a secure area comprising the steps of creating and storing baseline representations of subject characteristics. This method is comprised of creating an image of a subject, comparing the image of the subject to images in a resident data table, and directing the subject to a secondary area if the image of the subject matches an image in said resident data table. If the subject image does not match an image in said resident data table the method continues by providing a stimulus to the subject, creating post-stimulus representations of the subject characteristics, determining deviations in the subject characteristics from the baseline representation and the post-stimulus representations, comparing the deviations to predetermined deviation limits, and directing the subject to the secondary area if the deviations are outside of the deviation limits or granting access to the secure area if the deviations are within the deviation limits.

BRIEF DESCRIPTION OF THE DRAWINGS.

FIG. 2 is an embodiment of a Judgment Matrix.

DETAILED DESCRIPTION

Embodiments of a Physio-Recordation Inspection and Surveillance System (PRISS) are similar to conventional metal detection technologies currently employed by the air transportation industry. Embodiments of the PRISS augments a metal detector's capabilities through the use of digital imagining and physiological characteristics for identifying known and potential belligerents.

Embodiments of the disclosure employ physiological profiling to reduce the number of potential threats that require additional surveillance or investigation. The profiling mechanism employed by the system evaluates changes observed in body physiology when subjected to a predetermined stimulus. The stimulus is in the form of an audible query, statement, visible queue, or a combination thereof, which is pathologically designed to illicit a response. The stimulus can be posed in numerous languages, internationally recognized images, or other widely understandable audio/visual communication methods thereby increasing its effectiveness. The question asked or images shown are designed to illicit notable responses from individuals with malevolent intentions. Exemplary stimuli may include questions such as: Do you intend to perform criminal acts on this airplane?; What is the reason for your trip?; Are you considered to be a martyr?; or images such as indicia associated with known terrorist groups, pictures of weapons or other known terrorists.

As has been proven with lie detection technology and discussed above, individuals react in ways that may be profiled when asked questions that require a misleading answer or deception. Pulse rates are seen to change, perspiration often results, respiration rates change or spike, skin temperatures change, and coronal images often change.

Figure 1:
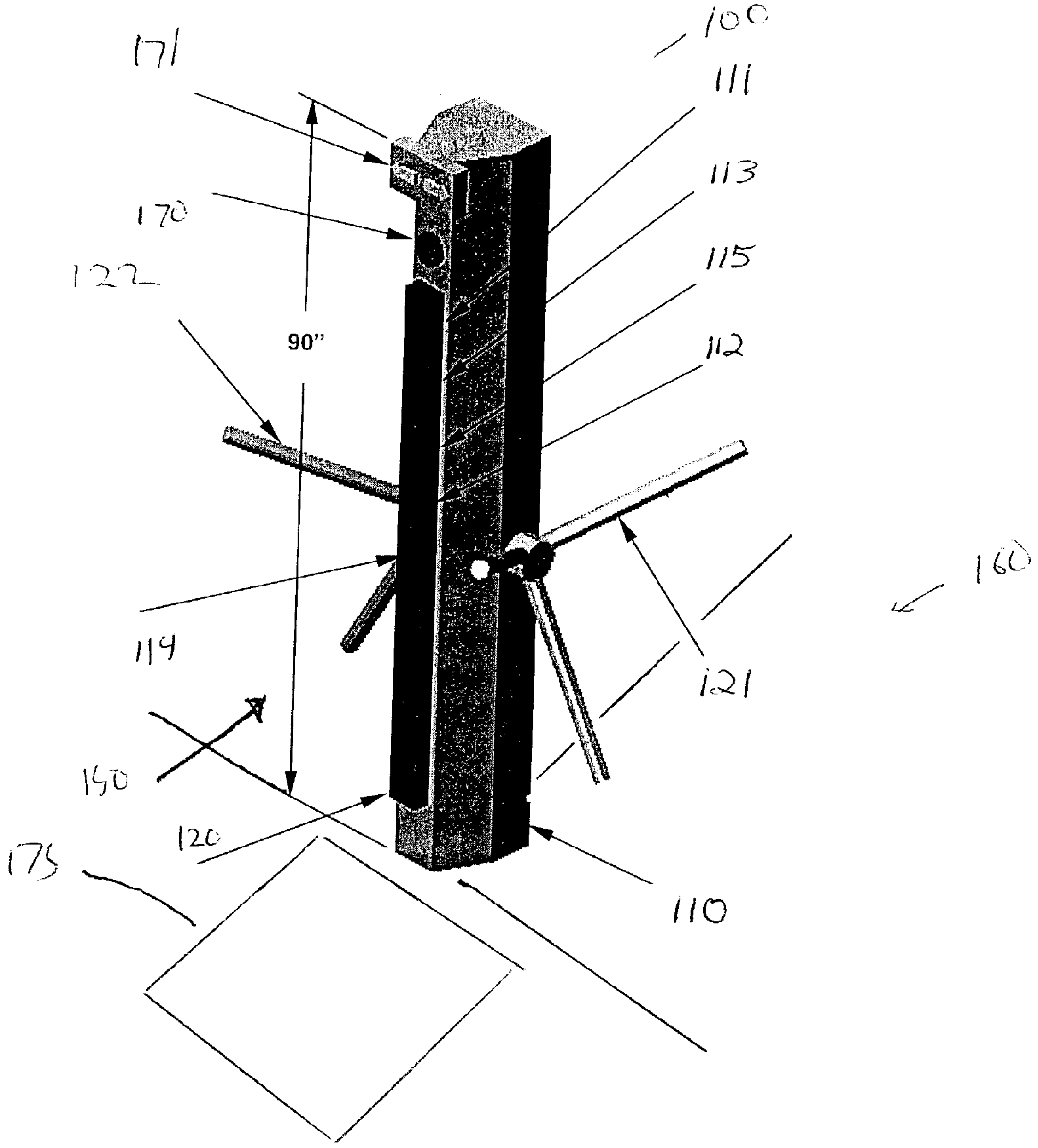
FIG. 1 is an embodiment of the Physio-Recordation Inspection and Surveillance System (PRISS) according to the disclosure.

An embodiment of the PRISS 100 shown in FIG. 1 requires the subject to pass through and stop momentarily within an evaluation portal. The evaluation portal is located at a general area, a secure area or at an access point to a secure area. The portal controls access to the secure area, along with access to a holding area. The individual is scanned to establish a baseline of data, subjected to a predetermined stimulus and scanned again. The latter scan data is compared to the baseline data to obtain a deviation (delta or change) and subjected to specific profile parameters in a processor. The profile parameters are physiological deviation thresholds associated with the type and nature of the subjected stimuli. In some embodiments of the disclosure, should the profile indicate an abnormal condition, (i.e. outside of the allowable threshold(s)), the subject is provided additional stimuli to affirm the deviation, subjected to different physiological monitoring or directed to a holding area and asked to answer additional questions by security personnel. To aid in this secondary assessment of subjects found in need of personal interaction and/or query, speech and/or stress recognition analysis may be provided in the holding area.

The embodiment in FIG. 1 shows a tower 110 with instrumentation including an thermal imaging camera 111 to determine changes in skin temperature, a coronal camera 112 to determine changes in an individual's coronal signature (i.e. iris color, pupil dilation), a normal light camera 113 for a pictorial comparison with known belligerents, and a heart rate and respiration sensor 114 to detect heart rate and respiration rate. In addition, embodiments of the portal include turnstiles or gates 121 and 122 that requires the subject to be in place until cleared by the system and granted access to the secure area 150, or directed to a holding area 160 for additional evaluation by security personnel.

The sensor devices are integrated within the front face 120 of the tower 110. The tower, houses the electromechanical components in such a fashion that enables the devices to "see" (monitor) the subject while protecting sensitive optics and electronic parts. The tower 110 permits gross adjustments of device position to match a subject's dimensions. The tower may be constructed from a bolted steel frame, metal, composite or plastic materials.

The thermal imaging camera 111 in FIG. 1 detects small changes in temperature and generates an electronic file that maps the facial and/or figure thermal signature of the subject before and after the stimulus. An associated processor then compares the baseline and response thermal signatures for depth of change, and generates data applicable to the deviation. The deviation is compared to a pre-established threshold for the given stimulus.

The digital imaging camera 113 of FIG. 1, captures facial features or figures to create a digital representation of the subject. The image data is compared by an associated processor to an image database for correlation to "Wants and Warrants" published or supplied by law enforcement, government or controlling organizations. The database may be on site or may be accessible from a remote or central site via public or proprietary communication systems. Subjects identified as suspect or worthy of note are directed to the holding area 160 for additional assessment by security personnel or detainment. Standard image digitization software may be used to construct the compared files. Embodiments of the disclosure may also integrate subject data obtained by bar code reading, key entry, or magnetic strip decoding, with the image data in one profile available for future recall. Image recognition software may also be used to establish matches to ethnic groups predetermined to require additional screening.

Facial recognition techniques in addition to determining identity can also detect minute facial discontinuities and reactions to the stimuli. These responses, combined with infrared imagery, create a signature of reaction. The reactions identified and categorized can include eyebrow movement, mouth reaction, involuntary muscular spasm/twitch, and ear movement. Changes in these reactions after the stimulus may likewise be compared to predetermined thresholds for determining malicious intent.

Pupil and iris recognition is accomplished with either a dedicated digital imaging camera 112 or with the digital imaging capabilities of the digital imaging camera 113, along with eye differentiating software. The software determines the size of the pupil, color of the iris and its respective unconscious reactions to the stimuli for comparison to a threshold.

Respiration and pulse rate are determined in the embodiment of FIG. 1 with a microwave heartbeat sensor 114 that records real time data and represents the heartbeats per minute before and after the stimulus for comparative purposes. Additionally, embodiments of the disclosure may include a Doppler respiratory rate sensor for obtaining the breathing rate before and after the exposure to the stimulus. The data is recorded in real time and compared before and after the time of stimulus for a deterministic relationship to a threshold.

The embodiment of FIG. 1 includes an electromagnetic imaging sensor 115 to detect magnetic abnormalities. Kurlian/tesla image data is captured and digitized in a processor. Two images are captured, correlating to pre and post stimulus. A processor maps the two electromagnetic fields of the subject. The two files created during the process will be compared and the deviation noted. The level of deviation is then compared to a threshold representing an acceptable "norm".

A stimulus interface with audio 170 and visual 171 capability shown in FIG. 1, permits pre-programmed communication with the subject. Audible instruction or query may be accomplished using speakers 170. Visual communication can be accomplished using flat screen, LED, or CRT with or without touch screen capabilities 171. Verbal responses can be monitored using microphone(s). While the tower may include a microphone, it is not the intent for the PRISS to exchange information in the primary area, only to provide stimulus.

Embodiments of the disclosure may also include a pressure and load sensitive floor plate 175 or resilient pad which may also possess magnetic sensors for metal detection. The floor plate may include load cells that supply data regarding pressure and weight shifting correlated to pre and post stimulus. The two sets of files created during the process are compared and the deviation obtained. The level of deviation is then compared to a predetermined threshold. The pad is located at the base of the tower prior to entrance to the secure area 150 or holding area 160. The load cells may also enable the accurate determination of a subject's weight. The load sensing pad may incorporate magnetic filament coils that enable the detection of metals and high mass materials from ground level to levels of 3 to 4 inches, thereby filling the normal gap in sensing found in many walk thru metal detectors. When metal is detected, a subject is directed by the system to the holding area for further search and query.

A visual interface 171 in the embodiment shown in FIG. 1, directs the subject to the appropriate area via visual signals. Such visual signals may also be accompanied by audio signals when evaluation is complete. The visual interface may be incorporated within the stimulus interface or may be a stand alone unit.

Turnstiles 121, 122 permit directed egress from the PRISS to the secure area 150, or to a secondary security or holding area 160. The gates are controlled by the processor as a result of the screening.

Other embodiments of the PRISS include the integration of turnstile operation with the actions of the baggage inspection operator. Suspect baggage may also cause the subject to be routed to the holding area. The PRISS tower may also physically incorporate magnetic strip and barcode readers to enable subjects to be tracked by destination (Boarding passes).

Comparisons between the baseline physiological parameters and the post stimulus parameters are accomplished with one or more processors. The processor(s) stores the baseline parameter and contrasts it to the post stimulus parameter to obtain the deviation for each physiological parameter monitored. Processor(s) may be a lap-top computer, a personal computer or other microprocessor. The processor memory can be internal or external to the processor. The processor also controls and coordinates the operation of the sensors and interfaces and performs a Judgment Matrix in determining whether the subject is within the predetermined norm.

A Judgment Matrix shown in FIG. 2 is implemented in some embodiments to facilitate "passage" choice either to the secure area 150 or to the holding area 160. The Judgment Matrix may be implemented with software in a processor or with hardware. Abnormal deviations in individual physiological parameters as described previously does not necessarily indicate stress or malevolent intent; however, when combined with other physiological parameters these deviations may provide enough indication for suspicion. The matrix establishes parameters of physiological information that will result in passage selection to the secure area 150 or the holding area 160. "If/then" programming supplies data to the Judgment Matrix which is ultimately responsible for passage selection. The matrix of the embodiment shown in FIG. 2 requires subjects to have two or more deviations outside the physiological threshold(s), correspond to an individual in the "Wants and Warrants" database or has detected with metal or high mass materials in order to be directed to the holding area 160 for further questioning and interrogation.

Figure 3:
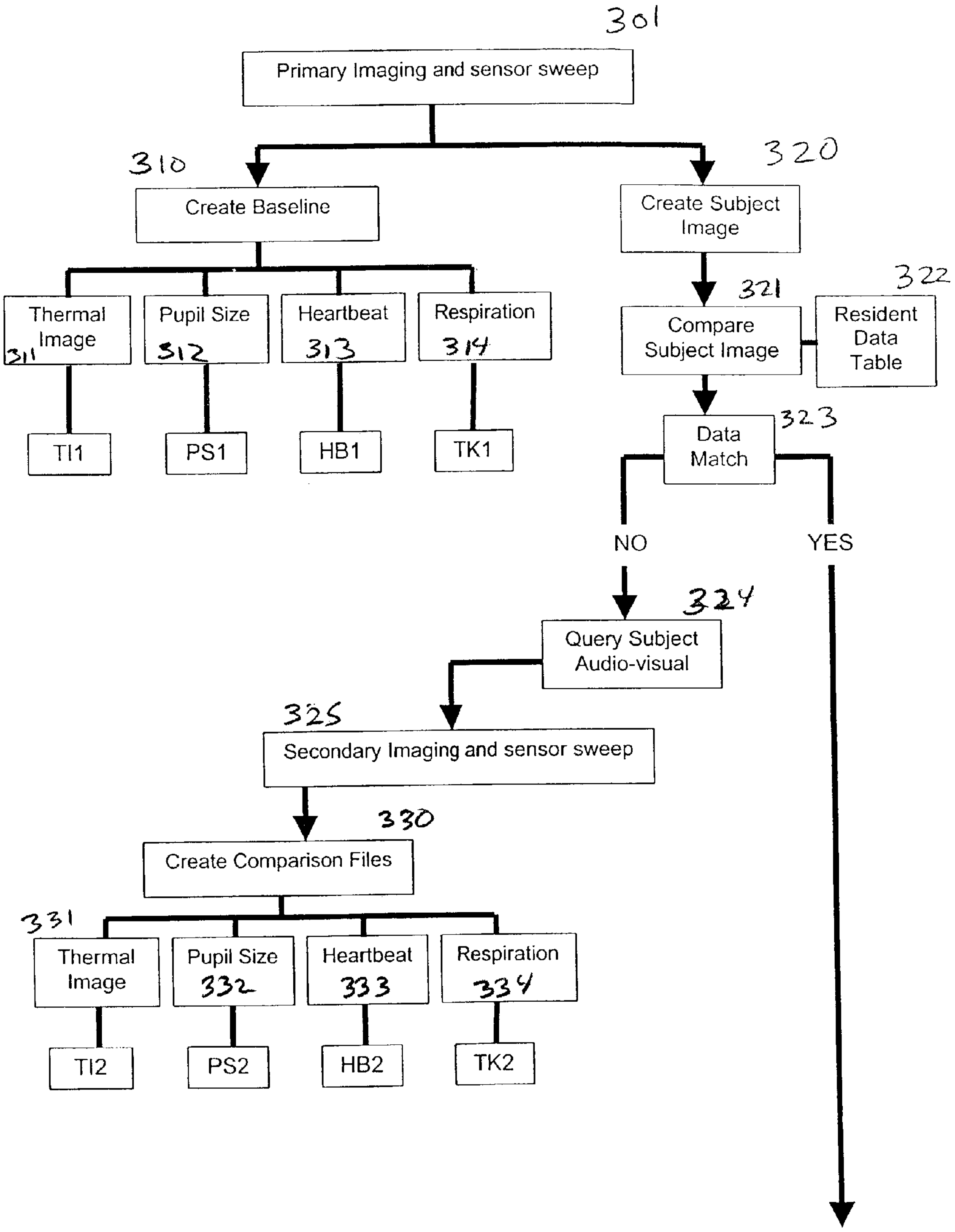
FIG. 3 is a functional diagram of an embodiment of the disclosure
Figure 3:
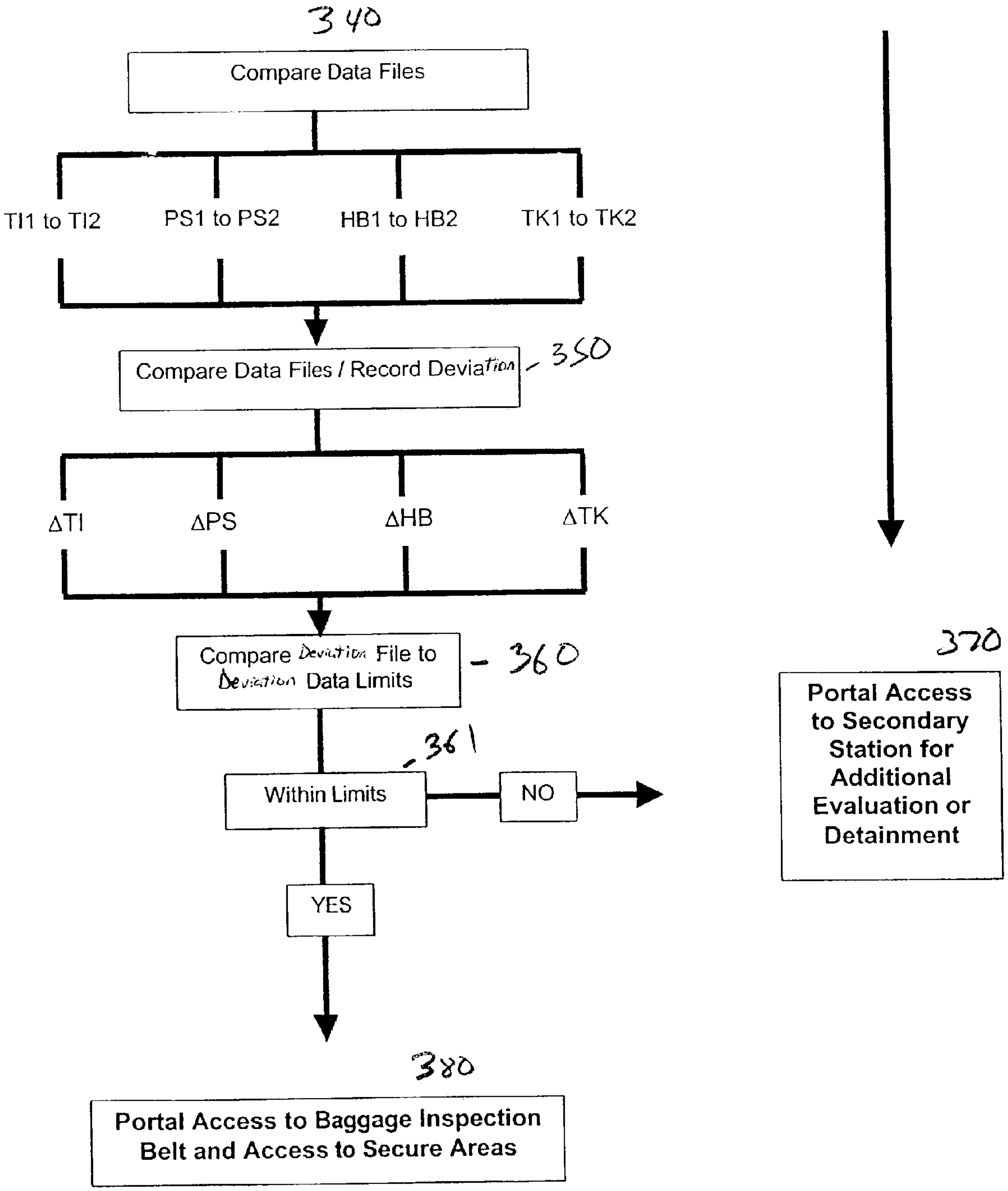

FIG. 3 shows a PRISS functional diagram for an embodiment of the disclosure. The embodiment includes a thermal sensor, pupil size recognition sensor, a heartbeat sensor and a respiration rate sensor. The embodiment represented also includes a digital imaging device. Other physiological parameter monitoring devices in operation with the system would be functionally equivalent. The inclusion or exclusion of physiological parameters in the diagram are solely for illustration.

Primary imaging and sensor sweep is initiated, as represented in block 301, upon the introduction of a subject into the system. The system creates baseline parameters in block 310 and a digital subject image in block 320. To create the baseline, a thermal image TI1 of the subject is created in block 311, the pupil size PS1 is determined in block 312, the heartbeat rate HB1 is determined in block 313 and the respiration rate TK1 is determined in block 314.

A digital image is created of the subject the image is compared in block 321 to a resident or central data table in block 322 containing images of those in a "Wants or Warrants" database as described previously. If there is no match in block 323, the subject is queried with an audio visual stimulus in block 324. Otherwise the subject is directed and granted access to the secondary station 370 (holding area) for additional evaluation or detainment.

After stimulated by the audio visual query, a secondary or post stimulus imaging and sensor sweep is initiated in block 325 as to create comparison files in block 330. In order to create the comparison files, a second thermal image T12 of the subject is created in block 331, a second pupil size PS2 is determined in block 332, a second heartbeat rate HB2 is determined in block 333 and second respiration rate TK2 is determined in block 334.

The baseline data files and the comparison files for the respective parameters are compared as represented in block 340. Specifically comparing T11 with T12, PS1 with PS2, HB1 with HB2 and TK1 with TK2 to determine and record deviations in block 350 for thermal image, pupil size, heartbeat and respiration rate ΔTI, ΔPS, ΔHB and ΔTK respectively.

The deviation files are then compared to thresholds representing the deviation data limits (acceptable limits) in block 360. The deviations are compared to the accepted limit for the given stimulus in blocks 361, as follows:

If ΔTI less than limit, then proceed to deferential comparison for ΔPS;

If ΔTI more than limit, initiates portal access to secondary station block 370 (additional query or detainment) or supplies abnormal ΔTI to additional logic functions (Judgment Matrix);

If ΔPS less than limit, then proceed to deferential comparison ΔHB;

If ΔPS more than limit, initiates portal access to secondary station or supplies ΔPS to additional logic functions;

If ΔHB less than limit, then proceed to deferential comparison ΔTK;

If ΔHB more than limit, initiates portal access to secondary station or supplies ΔHB to additional logic functions;

If ΔTK less than limit, then initiate portal access to secure area block 380 (baggage inspection belt and/or secure access area);

If ΔTK more than limit, initiates portal access to secondary station or supplies ΔTK to additional logic functions;

Scan complete, ready for next subject.

The estimated elapsed physical time is envisioned to require approximately 8 to 12 seconds to complete the screening of each subject as described in FIG. 3.

Figure 4:
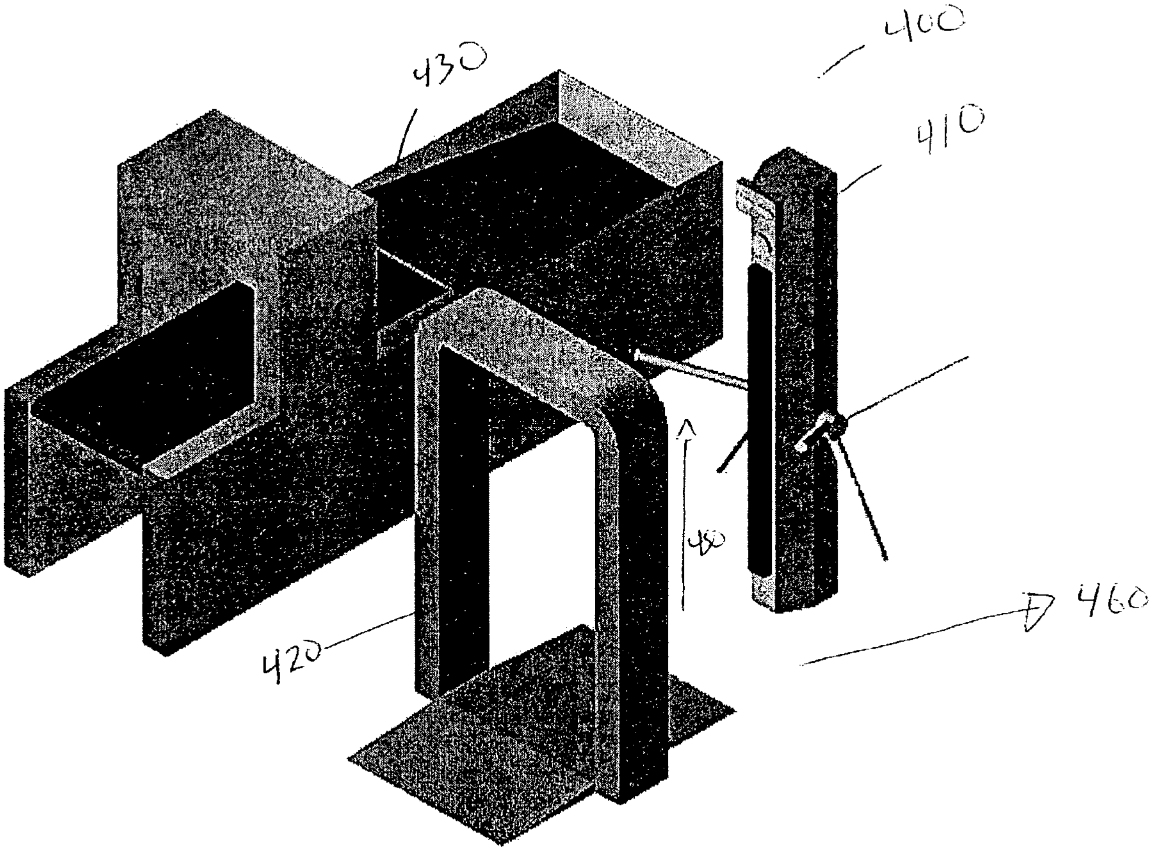
FIG. 4 is an embodiment of the PRISS in use with a metal detector and baggage screen.

Embodiments of PRISS may be installed beyond the metal detector portal 420 in such fashion as to provide easily enforced paths of egress as shown in FIG. 4. The paths of egress are either that direction 450 permitting the subject to proceed within the secure area 150 or the direction 460 requiring further inquiry in the holding area 160 by security personal. Normal practice would indicate the "passage left" would enable access to the secure area while "passage right" would enable further assessment.

The PRISS is intended to provide directed security inquires and is not to be defined as a 100% guarantor of true intent. It does, however, identify the candidate population with "something to hide" and enables further investigation. The stimulus can be selected based on the type of threat expected in the relevant facility. The associated thresholds or acceptable deviation limits for the stimuli are established empirically from tests conducted using known personnel, primed for the type of questions or images of the stimuli presented and who intentionally avoid the subject matter or lie, as who also behave normally. The thresholds may also be determined theoretically utilizing applied known psychological profiles.

The disclosure herein relates to a non-contact (passive) method of determining a plurality of human physiological responses to stimulus (audible and/or visible). Questions are presented by a regulatory agency to determine if the respondent is considering criminal activity directed towards the safe operation of a transportation system or is considering the conduct of such an activity in which the well-being or health of a large amount of people or property may be threatened. By measuring parameters such as heartbeat and respiration, skin temperature, eye, pupil and/or iris expansion, contraction and/or change, voice stress, electromagnetic aura and other similar responses through the use of a sensor suite, ill intent may be predicted. Sensor fusion and appropriate interpretation of physical responses will enable real time determination of potential criminal intent on the part of the subject or respondent.

What we claim is:

1. An inspection station for determining a subject's physiological reaction to a stimulus comprising:

one or more physiological stand-off sensors;

an electronic storage device;

a stimulation interface capable of exposing the subject to a predetermined stimulus object;

one or more controllable egress gates; and a processor functionally connected to one or more of said sensors, said storage device, said interface and said one or more controllable gates wherein said stimulus object has an associated deviation limit.

2. The inspection station of claim 1, wherein the one or more physiological stand-off sensors are selected from the group comprising: a thermal imaging camera; a digital imaging camera; a tesla field sensor, a Kurlian field sensor; a metal detector; a respiration rate sensor; a heartbeat sensor; and, a voice modulation sensor.

3. The inspection station of claim 1, wherein the subject interface comprises an audio and visual interface.

4. The inspection station of claim 1, further comprising a pressure sensitive floor plate functionally connected to said processor.

5. The inspection station of claim 1, further comprising a "Wants and Warrants" database.

6. A method for profiling a subject without physical contact comprising the steps of:

acquiring a baseline representation of at least one characteristic of the subject;

prompting the subject with an automatically generated visual or audio object or stimulus;

acquiring a post-prompting representation of at least one characteristic of the subject;

determining if a difference in at least one characteristic between the post-prompting representation and the baseline representation exceeds an associated threshold; and, profiling the subject based on any exceeded thresholds.

7. The method of claim 6, wherein the characteristic of the subject is selected from the group comprising: a thermal image; a digital image; a electro magnetic field; a pulse rate; a voice pattern; a pressure distribution; and, a metal content.

8. The method according to claim 6, further comprising the step of: storing the baseline representation of the characteristic in an electronic storage device.

9. The method according to claim 8, further comprising the step of retrieving the stored baseline representation of the characteristic to determine the difference with respect to the post-prompting representation.

10. The method according to claim 6, further comprising the step of directing the egress of the subject based on the profile.

11. The method according to claim 6, wherein the step of profiling includes determining whether secondary assessment is required.

12. The method according to claim 6, wherein the step of profiling includes the step of applying the differences and thresholds for each of the at least one characteristic to a judgment matrix.

13. The method according to claim 6, further comprising the step of accessing a "Wants and Warrants" database.

14. The method according to claim 13, further comprising the step of comparing.

15. A method of screening subjects for access to a secure area comprising the steps of:

creating and storing baseline representations of subject characteristics;

creating an image of a subject;

comparing the image of the subject to images in a resident data table;

if the image of the subject matches an image in said resident data table, directing subject to secondary area; otherwise, providing a stimulus to the subject;

creating post-stimulus representations of the subject characteristics;

determining deviations in the subject characteristics from the baseline representation and the post-stimulus representations;

comparing the deviations to predetermined deviation limits;

directing the subject to the secondary area if the deviations are outside of the deviation limits; and, granting access to the secure area if the deviations are within the deviation limits.

16. The method of claim 15, wherein the subject characteristics comprise: a thermal image; pupil size; heartbeat rate; and, respiration rate.

17. The method of claim 15, wherein the subject characteristics are one or more of the characteristics selected from the group comprising: a thermal image; pupil size; iris color; heartbeat rate; respiration rate; electromagnetic field; pressure distribution; and, voice modulation.

18. The method of claim 15, further comprising the step of performing secondary screening of subjects in the secondary area.

19. The method of claim 15, wherein the stimulus is an audio or visual object.

20. The method of claim 19, wherein the object is a question.

21. The method of claim 19, further comprising the steps of providing a pre-stimulus to the subject prior to the step of creating and storing baseline representations.

22. The method of claim 21, wherein the pre-stimulus is an audio or visual object.

23. A method of screening subjects comprising the steps of:

creating and storing baseline representations of subject characteristics;

providing a predetermined stimulus to the subject;

creating post-stimulus representations of the subject characteristics;

determining a threshold as a function of the predetermined stimulus;

determining deviations in the subject characteristics from the baseline representation and the post-stimulus representations;

comparing the deviations to the threshold;

identify subjects whose deviations exceed the threshold.

24. The method of claim 23 wherein the predetermined stimulus is at least one of a visual image, an audio signal, a verbal query, and a visual query.

* * * * *